United States Patent [19]

Shimano

[11] 4,371,176
[45] Feb. 1, 1983

[54] SEALING CONSTRUCTION FOR ROTATING PORTIONS AT A BICYCLE

[75] Inventor: Keizo Shimano, Sakai, Japan

[73] Assignee: Shimano Industrial Company Limited, Osaka, Japan

[21] Appl. No.: 157,027

[22] Filed: Jun. 6, 1980

[30] Foreign Application Priority Data

Jun. 20, 1979 [JP] Japan .................. 54-85325[U]

[51] Int. Cl.³ .............................................. F16J 15/44
[52] U.S. Cl. .................................... 277/56; 308/187.1
[58] Field of Search ............................. 277/12, 53–57; 308/187.1, 187.2

[56] References Cited

U.S. PATENT DOCUMENTS

| | | | |
|---|---|---|---|
| 1,925,898 | 9/1933 | Fritz | 277/56 |
| 3,477,385 | 11/1969 | Tangeman et al. | 277/56 |
| 3,739,444 | 6/1973 | Vargo | 277/56 |
| 3,957,277 | 5/1976 | Margnelli | 277/56 |
| 4,153,258 | 5/1979 | Hüber | 277/56 |

FOREIGN PATENT DOCUMENTS

| | | |
|---|---|---|
| 500327 | 5/1979 | Australia . |
| 384910 | 11/1923 | Fed. Rep. of Germany . |
| 439411 | 6/1912 | France . |
| 547175 | 12/1922 | France . |
| 893781 | 10/1944 | France . |
| 992460 | 10/1951 | France . |
| 1067711 | 6/1954 | France . |
| 1208766 | 2/1960 | France . |
| 1359386 | 3/1964 | France . |
| 2040896 | 1/1971 | France . |
| 2175477 | 10/1973 | France . |
| 185127 | 11/1923 | United Kingdom . |
| 191708 | 11/1923 | United Kingdom . |

Primary Examiner—Robert I. Smith
Attorney, Agent, or Firm—Stevens, Davis, Miller & Mosher

[57] ABSTRACT

A sealing construction for rotating joints of a bicycle, in which two or more first sealing members and second sealing members of ring-like shape are mounted alternately one after another on a stationary member and a rotary member and a gap therebetween is closed through an annular, zigzag and narrow passage, so that the narrow passage functions to provide a labyrinth effect, thereby preventing dust or rain water from entering a bearing.

7 Claims, 3 Drawing Figures

SEALING CONSTRUCTION FOR ROTATING PORTIONS AT A BICYCLE

FIELD OF THE INVENTION

This invention relates to a sealing construction applied to rotating joints of a bicycle, and more particularly to a sealing construction used mainly for the bicycle hub rotatably supporting a hub shell to a hub shaft through bearings.

In addition, the rotating joints in this invention, besides the hub, includes rotating joints between a head pipe at the bicycle frame and a front fork rotatably supported thereto, between a bottom bracket of the bicycle frame and a crank shaft rotatably supported thereto, and between a pedal shaft and a pedal body rotatably supported thereto where the hub shaft, head pipe, bottom bracket and pedal shaft, are designated as the stationary members and the hub shell, front fork, crank shaft and pedal body, are designated as the rotary members.

BACKGROUND OF THE ART

Generally, such rotating portions are sealed by use of a ring-like shaped sealing member formed of flexible material and mounted on the stationary or rotary member, so that the sealing member closes a gap between the stationary member and the rotary member, thereby preventing dust or rain water from entering the bearings.

The sealing member in such a construction, however, contacts at its inner periphery or outer periphery with the rotary member or stationary member to close the gap. However, the sealing is incomplete and exhibits a large frictional resistance. As a result, not only is the rotary member hindered from smooth and light rotation but also wear of the sealing member occurs requiring a renewal of the sealing member in a short time.

SUMMARY OF THE INVENTION

In order to eliminate the above conventional defects, this invention has been designed. An object of the invention is to provide a sealing construction preventing dust or rain water from entering the gap between the stationary member and the rotary member while allowing the rotary member to rotate smoothly and lightly, and also making the sealing member free from wear.

In detail, this invention uses two or more first and second sealing members of ring-like shape, so that the sealing members are mounted alternately one after another on the stationary and rotary members, thereby closing a gap between the stationary member and the rotary member through a narrow passage which is zigzag and annular, the narrow passage providing a labyrinth effect, thereby reliably preventing dust or rain water from entering the bearings from the exterior.

In greater detail, each of the first sealing members is larger in diameter than the second sealing member and has a first annular projection extending radially inwardly from the inner periphery of the first sealing member. Each of the second sealing members has an annular projection extending radially outwardly from the inner periphery of the second sealing member, the first and second projections being smaller in axial thickness than each sealing member. The first projection has an inner diameter larger than an outer diameter of the second sealing member. The second projection has an outer diameter smaller than an inner diameter of the first sealing member. The first sealing member is supported to one of the stationary and rotary members, in other words, onto the inner periphery of one member positioned radially outwardly of the other member. The second sealing member is supported to the other member, in other words, on the outer periphery of the other member positioned radially inwardly of the one member, so that the first and second sealing members are supported alternately to the stationary and rotary members in a manner disposing each projection axially opposite to each other at a minimum interval.

Hence, the gap between the stationary member and the rotary member is closed by means of the first and second projections while leaving a zigzag and narrow annular passage within the gap, thereby ensuring that dust or rain water from entering the bearings from the exterior because of the labyrinth effect of the passage.

Each projection at the first and second sealing members is disposed radially opposite to each sealing member through the narrow passage so as not to contact with each sealing member, thereby enabling the rotary members to smoothly rotate without frictional resistance and the sealing member to be free from wear.

BRIEF DESCRIPTION OF THE DRAWINGS

An embodiment of the invention applied to a bicycle hub is shown in the drawings, in which.

DETAILED DESCRIPTION OF THE INVENTION

Figure 1:
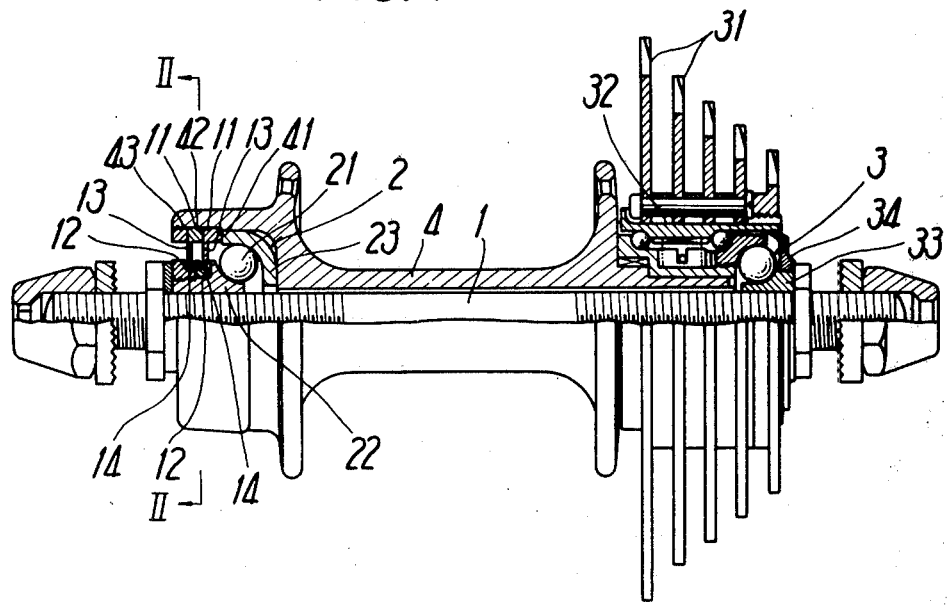
FIG. 1 is a partially cutaway front view of the embodiment.
Figure 2:
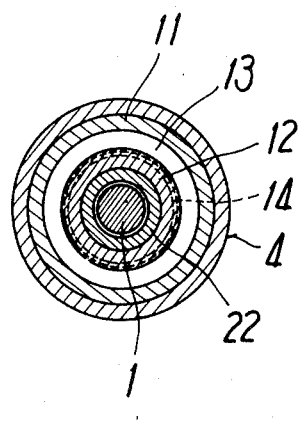
FIG. 2 is a sectional view taken on the line II—II in FIG. 1.

In the drawings is shown an embodiment of the sealing construction of the invention, which is applied to the bicycle hub comprising a hub shell 4 rotatably supported to a hub shaft 1 through a pair of first and second bearings 2 and 3.

In detail, the sealing construction is used for sealing a gap between the hub shell 4 and the hub shaft 1 positioned axially leftwardly of the bearing 2, which comprises balls 21, a ball holder 22 and a ball race 23 press-fit to the hub shaft 1.

The sealing construction of the invention comprises a combination of two or more first sealing members 11 and second sealing members 12 each of ring-like shape. Each of the first sealing members 11 is larger in diameter than the second sealing member 12 and has a first annular projection 13 extending radially inwardly from the inner periphery of the sealing member 11, the first projection 13 being smaller in axial thickness than the first sealing member 11 and having an inner diameter slightly larger than an outer diameter of the second sealing member 12. Each of the second sealing members 12 is smaller in diameter than the first sealing member 11 and has a second projection 14 extending radially outwardly from the outer periphery of the sealing member 12. The second projection 14 also is smaller in axial thickness than the second sealing member 12 and has an outer diameter smaller than an inner diameter of the first sealing member 11.

Figure 3:
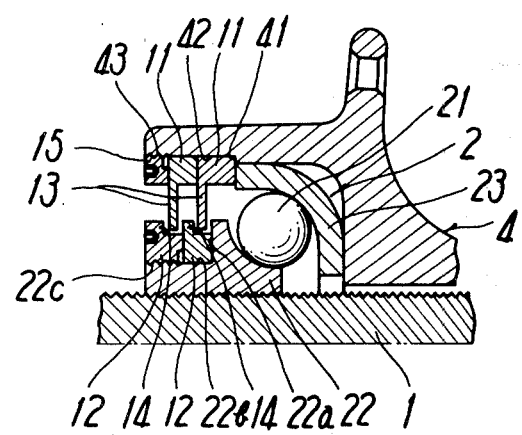
FIG. 3 is a partially enlarged sectional view in the embodiment.

The sealing construction of the invention is applied to the hub in such a manner that the first sealing member 11, as enlarged and shown in FIG. 3, has an outer diameter fit to a diameter of the inner periphery of hub shell 4 and insertably supported onto the inner periphery thereof. The second sealing member 12 has an inner diameter fit to an outer diameter of the ball holder 22 screwed with the hub shaft 1 and sleeved onto the ball outer periphery of holder 22, in which each of the first and second projections 13 and 14 at the sealing member 11 and 12 is mounted alternately axially opposite to each other.

The sealing members 11 and 12 are each made mainly from metal or hard synthetic resin and mounted alternately one after another on the hub shell 4 and ball holder 22 by screwing the sealing members 11 and 12 with the hub shell 4 and ball holder 22 through screw threads provided at these members, by a press-fit, by a binding, or by the use of a snap ring.

In detail, the first sealing members 11, as shown in FIG. 3, are mounted on the hub shell 4 in such a manner that the hub shell 4 is provided at its inner periphery with a stepped portion 41, a fitting portion 42 adjacent thereto, and a screw thread 43 only at the axially outward portion at the inner periphery, so that the first sealing member 11 to be mounted at first is inserted into the hub shell 4 to contact with the stepped portion 41 and the end face of ball race 23, and the sealing member 11 inserted at last is urged by a threaded ring 15 screwed with the screw thread 43, thereby tightening the inserted sealing members 11 toward the stepped portion 41. On the other hand, the second sealing members 12, as shown in FIG. 3, are mounted on the ball holder 22 in such a manner that the ball holder 22 is provided at its outer periphery with a stepped portion 22a, an extension 22b adjacent thereto and extending axially outwardly from the ball holder 22, and a screw thread 22c only at the axially outward portion, so that the second sealing member 12 to be mounted at first is inserted onto the ball holder 22 and contacts with the stepped portion 22a and then the sealing member 12 is mounted last and has a screw thread screwed with the screw thread 22c, thereby urging the second sealing members 12 toward the stepped portion 22a.

The first and second sealing members 11 and 12 are mounted on the hub alternately one after another so that each first projection 13 is axially opposite to each second projection 14 at a minimum interval, thereby forming a zigzag passage with the sealing members 11 and 12 and the projections 13 and 14.

Consequently, a gap between the hub shell 4 and the ball holder 22 can be closed and a labyrinth effect obtained from the narrow passage can reliably prevent dust or rain water from entering the bearing 2 from the exterior.

In other words, dust or rain water, when tending to enter the bearing 2, must pass through a narrow passage between the projections 13 and 14 at the axially outermost positions, whereby most dust or rain water is restrained from entering at this stage. The dust or rain water, which has passed through the above passage, must next pass through a narrow passage between the first projection 13 and the outer periphery of second sealing member 12 and sequentially through the following narrow passage between the first projection 13 and the next second projection 14 at the axial inside thereof.

In brief, the above passage is not straight but zigzag to increase resistance against the entrance of dust or rain water to thereby ensure that the dust or rain water is prevented from entering the bearing 2 positioned inside said passage. Furthermore, the projections 13 and 14 are not in contact with the sealing members 11 and 12 respectively, thereby allowing the hub shell 4 to rotate without hindrance.

In the aforesaid construction, the first sealing member 11, alternatively, may be mounted on an extension extending axially outwardly from the ball race 23 fixed to the hub shell 4, or the second sealing member 12 may be mounted on the hub shaft 1.

The aforesaid embodiment has been described as to the sealing construction at the axially left side of hub shell 4 in the drawings. This construction is similarly to the right side.

The hub shown in FIG. 1 is incorporated at the right side with a driving member 32 having sprockets 31, in which the first sealing members are mounted on the inner periphery of driving member 32 and the second sealing member 12 on the hub shaft 1 on the outer periphery of a ball holder 33 at a bearing 3 screwed with the hub shaft 1, thereby applying the sealing construction of the invention similarly to the right side of the hub. Incidentally, in FIG. 1, a sealing member 34 of conventional flexible material is mounted on the ball holder 33.

The sealing construction of the invention applied only to the hub is shown in the drawings, but is applicable to other rotating joints, for example, between a head pipe of the bicycle frame and a front fork rotatably supported to the head pipe, a bottom bracket and a crank shaft rotatably supported to the bottom bracket, or a pedal shaft and a pedal body rotatably supported thereto.

In brief, this sealing construction of the invention is applicable to all rotating joints between the stationary members and the rotary members rotatably supported thereto through bearings, which will be easily understandable by those skilled in the art. In addition, the above stationary members include the hub shaft, head pipe, bottom bracket, and pedal shaft and the rotary members include the hub shell, front fork, crank shaft and pedal body.

The projections 13,14 are integral with the sealing members 11 and 12 respectively in the aforesaid embodiment, which alternatively may be separate from the sealing members 11 and 12. In this instance, the separate projections 13 and 14, other than being fixed to the sealing members 11 and 12, may be mounted between each sealing member 11 and sealing member 12 in a manner of being sandwiched therebetween.

As clearly understood from the above description, two or more first and second sealing members of ring-like shape and having projections are combined to be mounted alternately one after another, whereby the sealing members with the projections are mountable on the stationary and rotary members disposing the projections axially opposite to each other, and each projection is opposite to another at a minimum gap to form the zigzag passage. Hence, the labyrinth effect of a narrow passage can reliably prevent dust or rain water from entering the bearing and also each projection does not contact with each sealing member, thereby permitting the rotary members to rotate more smoothly and lightly in comparison with the conventional sealing construction.

While an embodiment of the invention has been shown and described, the invention is not limited to the specific construction thereof, which is merely exemplary.

What is claimed is:

1. A bicycle hub comprising a hub shaft, a pair of ball holders screwed with said hub shaft, balls supported to said ball holders, ball races receiving said balls, and a hub shell rotatably supported to said hub shaft through said balls, said bicycle hub having at least one first sealing member of ring-like shape, and at least one second sealing member of ring-like shape mounted adjacent to a first sealing member, each said first sealing member being larger in diameter than each said second sealing member, each said first sealing member being supported on the inner periphery of said hub shell and having a first annular projection extending radially inwardly from an inner periphery thereof, at least one of said ball holders having an extension which projects axially outwardly through a stepped portion, each said second sealing member having an inner diameter slightly larger than said extension of said ball holders, and being supported to said extension of said ball holder and having a second annular projection extending radially outwardly from the outer periphery thereof, said second annular projection having an outer diameter larger than an inner diameter of said first annular projection.

2. A bicycle hub as in claim 1 wherein the axial thickness of said first annular projection is smaller than the axial thickness of said first sealing member and the axial thickness of said second annular projection is smaller than the axial thickness of said second sealing member.

3. A bicycle hub according to claim 1, wherein each of said first and second projections are integral with each of said first sealing member and second sealing member respectively.

4. A bicycle hub according to claim 1, wherein each said first and second sealing member has a screw means which is screwable with one of said hub shell and said extension of said ball holder.

5. A bicycle hub according to claim 1, wherein said hub shell and ball holder have fixing portions for respectively fixing each of said first and second sealing members.

6. A bicycle hub according to claim 5, wherein said first and second projections are separate from said first and second sealing members and are adapted to be integral therewith by fixing said first and second sealing members to said hub shell and ball holder through said fixing portions.

7. A bicycle hub according to claim 1 wherein a plurality of first sealing members and a plurality of second sealing members are alternately provided in an axial direction of said hub shaft between said hub shell and hub shaft.

* * * * *